United States Patent [19]
Arvin et al.

[11] 3,990,468
[45] Nov. 9, 1976

[54] UNIVERSAL INSERT FOR FABRICATION OF FLUID LOGIC ELEMENTS

[75] Inventors: Paul Arvin; Larry L. Seeley, both of Bryan, Ohio

[73] Assignee: The Aro Corporation, Bryan, Ohio

[22] Filed: Sept. 20, 1974

[21] Appl. No.: 507,873

[52] U.S. Cl. .......................... 137/269; 137/625.66; 137/270; 251/359
[51] Int. Cl.[2] .......................... F16K 11/02
[58] Field of Search .............. 137/269, 112, 625.25, 137/625.66, 270; 251/359, 360

[56] References Cited

UNITED STATES PATENTS

| | | | |
|---|---|---|---|
| 2,225,296 | 12/1940 | Christos, Jr. | 251/359 |
| 2,631,612 | 3/1953 | Buescher | 251/360 X |
| 2,754,840 | 7/1956 | Hicks, Jr. | 137/454.6 |
| 3,126,915 | 3/1964 | Hunt | 137/625.5 |
| 3,196,896 | 7/1965 | Leutenegger | 269/74 |
| 3,244,193 | 4/1966 | Loveless | 137/454.6 |
| 3,272,221 | 9/1966 | Flick et al. | 137/270 |
| 3,385,322 | 5/1968 | Brandenberg | 137/625.66 |
| 3,389,720 | 6/1968 | Brandenberg | 137/625.66 |
| 3,604,460 | 9/1971 | DeLrue | 137/269 X |
| 3,707,162 | 12/1972 | Bachmann | 137/269 |
| 3,724,813 | 4/1973 | Baumann | 251/360 |
| 3,794,075 | 2/1974 | Stoll | 137/625.66 |

*Primary Examiner*—Martin P. Schwadron
*Assistant Examiner*—Robert J. Miller
*Attorney, Agent, or Firm*—Allegretti, Newitt, Witcoff & McAndrews

[57] ABSTRACT

A universal logic body block includes a number of identical cavities having accompanying passageways of identical number and pattern. Each single cavity forms the basic housing for installation of various components to perform logic functions AND, OR, NOT and TIM. A primary universal insert fitted within the above-described cavities of the universal logic body block in combination with various other valve elements will provide an AND, or NOT logic function. A universal secondary seat may be fitted within a cavity in one manner in combination with other components, to provide the logic functions AND, OR and NOT. Additional specialized inserts are provided for insertion into a cavity of the universal logic body block in combination with various valve elements to provide the TIM logic function or the OR function. Various logic circuits can be formed in one block by means of connections between separate logic devices.

7 Claims, 15 Drawing Figures

UNIVERSAL INSERT FOR FABRICATION OF FLUID LOGIC ELEMENTS

BACKGROUND OF THE INVENTION

The present invention relates to an improved movable diaphragm, fluid logic element construction and, more particularly, to a device wherein a universal body block includes an opening or cavity for receipt of universal inserts to provide a binary fluid logic function, the particular function depending upon the arrangement of the inserts and valve means selected for cooperation with the universal body block opening. Complex logic circuits may be made by appropriate interconnection of separate logic functions or elements in a single body block having multiple openings or cavities.

Utilizing valved elements to perform logic functions for the control and operation of machines has met with increasing acceptance during the past 15 years. A publication which describes the history of these and related developments was recently translated into English and published by John Wiley & Sons (1973), "Fluid Logic Controls and Industrial Automation" by Daniel Bouteille. Among the valved elements discussed in this publication are various ones made by the assignee of this present application, including those described in Brandenberg U.S. Pat. No. 3,403,693; U.S. Pat. No. 3,385,322; and U.S. Pat. No. 3,389,720. These elements have been generically described as "diaphragm operated fluid logic elements" or "flexible diaphragm fluid logic operated elements". The separate elements have the capability of performing standard binary logic functions such as OR, AND, NOT and the like.

Because separate logic elements perform separate logic functions, it is necessary to construct each element from a distinct set of component parts. Although in the past there has been some interchangeability in parts, for example, diaphragms, poppets and certain seals, each part of a binary element is substantially unique. It is, therefore, desirable to provide a construction for separate fluid logic elements (OR, AND, NOT, TIMING, etc.) wherein components are interchangeable or universal. Then, by merely rearranging or omitting some of the components, it will be possible to provide the desired logic function. An additional desirable feature is to provide a structure utilizing universal parts wherein a multiplicity of separate functions may be provided and further, wherein the separate functions can be easily interconnected to provide a complex circuit,

DESCRIPTION OF THE PREFERRED EMBODIMENT

In a principal aspect, the present invention relates to the structure of various universal parts for the formation of distinct fluid logic elements as well as complex circuits comprised of more than one logic element. Included in the combination is a universal body block with one or more universal openings or cavities.

The body block preferably includes a number of identical cavities extending through the body block. Each cavity is comprised of a number of connected, cylindrical sections, each section having a lesser diameter. Each cavity includes a passageway extending radially to the outside edge of the body block to the atmosphere. Associated with each cavity are two modularly positioned, axial passageways for connecting the end of the body block with a prescribed portion of the body block cavity. Additional passageways may extend axially through the body block. These additional passageways may be used to direct air from one end of the block to the other or to receive fastening means for assembly of various components of a complex circuit.

A universal secondary valve seat is provided to engage a section of a cavity. The secondary valve seat includes a central longitudinal passageway connecting its opposite ends. One end of the secondary valve seat includes a circumferential, annular ridge. The opposite end of the secondary valve seat includes a flattened portion which has radially extending grooves connecting the central passageway of the valve seat to the outer surface.

A primary universal insert is also provided. The primary insert includes a central longitudinal passage connecting the opposite ends of the insert. Valve seats are positioned along the length of this passage and channels extend from the passage intermediate the valve seats to a point on the outside surface of the insert. A primary insert may be positioned within a cavity of the body block in combination with the secondary valve seat, other valves, a poppet and diaphragms in a prescribed relation in order to provide the fluid logic element desired. Complex circuits are created by interconnecting distinct elements, i.e., cavities.

It is thus our object of the present invention to provide an improved fluid logic circuit element and circuit construction.

A further object of the present invention is to provide a fluid logic element wherein a primary universal insert member may be provided for the element to provide either an AND or NOT function depending upon the accessories utilized with the primary universal insert.

Another object of the present invention is to provide a universal body block with a multiple number of identical cavities for fabricating a plurality of logic elements that are interconnectable to form a desired complex logic circuit. The universal body block may be fabricated by inexpensive molding or other processing means without the necessity of complex machining operations.

Still another object of the present invention is to provide a universal secondary valve seat for a fluid logic element that may be used in combination with the universal logic body block to provide different valve seat arrangements depending on the manner of insertion in the universal body block.

Still another object of the present invention is to provide a universal insert for a fluid logic element wherein the insert may be fabricated by inexpensive molding or other processing means.

One further object of the present invention is to provide an improved flexible diaphragm fluid logic element capable of being manufactured from inexpensive materials without the necessity of complex machining or other finishing operations.

Another object of the present invention is to provide a means of fabricating complete fluid logic circuits in a single, compact, integrated package without using discrete individual logic elements to provide complete circuits.

These and other objects, advantages and features of the invention will be set forth in the detailed description which follows.

BRIEF DESCRIPTION OF THE DRAWING

In the detailed description which follows, reference will be made to the drawing comprised of the following Figures.

DESCRIPTION OF THE PREFERRED EMBODIMENT

Figure 1:
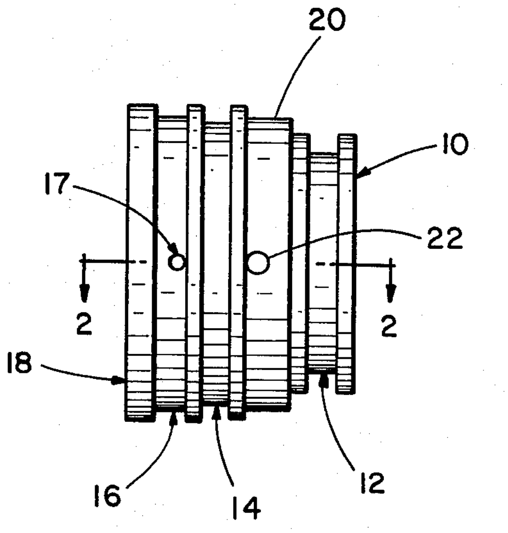
FIG. 1 is a side elevation view of the primary universal insert of the present invention.
Figure 2:
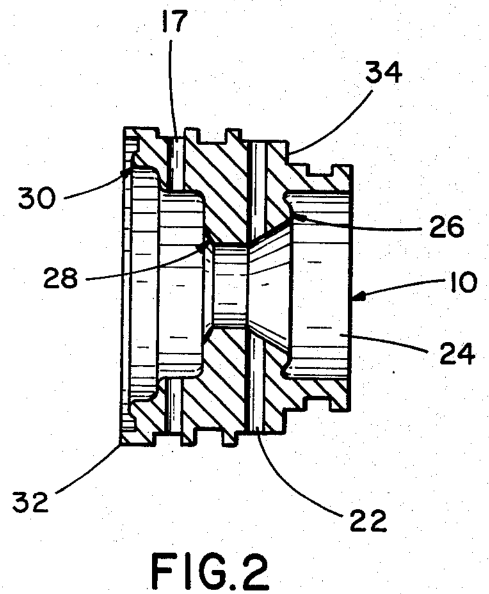
FIG. 2 is a cross-sectional view of the insert of FIG. 1 taken along the line 2—2 of FIG. 1.

A primary universal insert 10 which is utilized in combination to construct various fluid logic elements is illustrated in FIGS. 1 and 2. In the embodiment disclosed, the insert 10 is cylindrically shaped and preferably molded from a plastic material. The insert 10 includes a first circumferential groove 12 for receiving an O-ring seal, as will be later described, and a second circumferential sealing groove 14. An exhaust passage groove 16 is defined intermediate the sealing groove 14 and the top 18 of the insert 10. A fluid flow passage groove 20 is intermediate sealing grooves 12 and 14. Groove 20 is connected with a radial passage 22 that, in turn, connects with an interior passage 24 of the insert 10 as illustrated in FIG. 2. The exhaust passage groove 16 is likewise connected with a radial exhaust passage 17 that connects with interior passage 24 of the insert 10 as illustrated in FIG. 2.

The longitudinal passage or opening 24 extends axially through the insert 10. The cross-sectional area of the passage 24 varies along the length of the insert 10 to define various seats for valve members and the like. Thus, a first or lower seat 26 is defined by an annular ridge within the passage 24. A second, opposed seat 28 is also defined within the passage 24. Finally, an annular ridge 30 is defind adjacent top 18 to cooperate with a flexible diaphragm element (54 in FIG. 3) to provide seating and sealing for element 54 in cooperation with an outer circumferential flange 32 of the insert 10..

The insert 10 also includes outer circumferential lands, as at 34, which cooperate with compatible lands or flanges of a universal body block element (40 in FIG. 3) to effect precise placement and retention of the insert 10 within a body block element 40.

Figure 3:
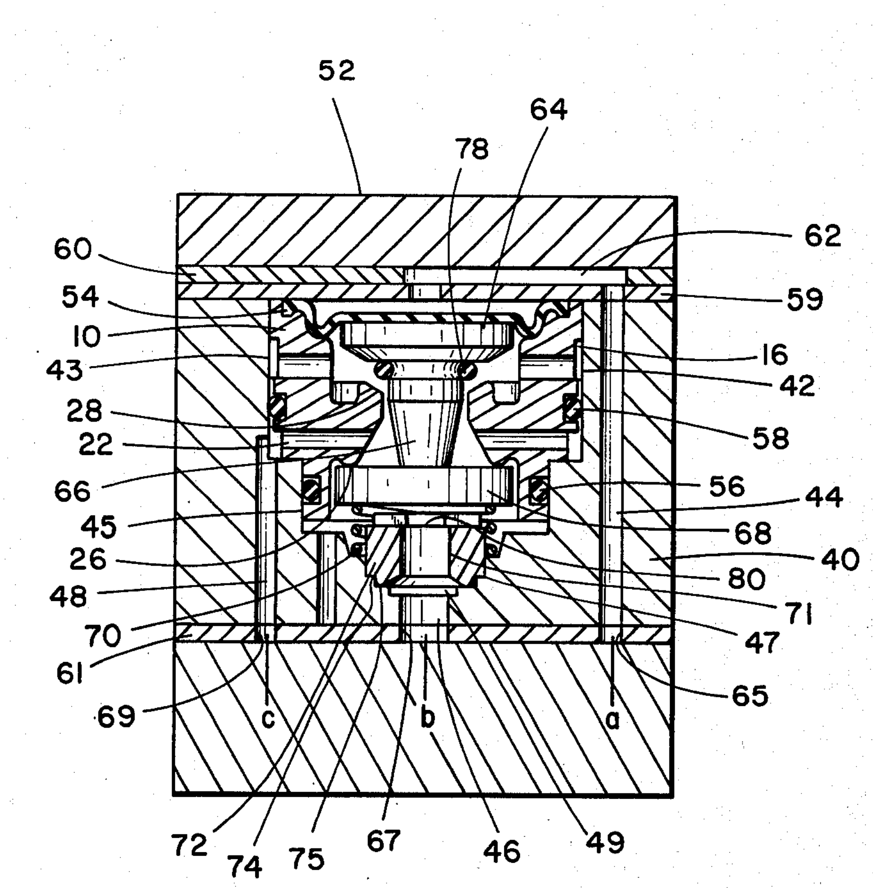
FIG. 3 is a cross-sectional view of the primary universal insert in combination with a universal secondary seat or seat insert and a universal body block to form an AND element.
Figure 4:
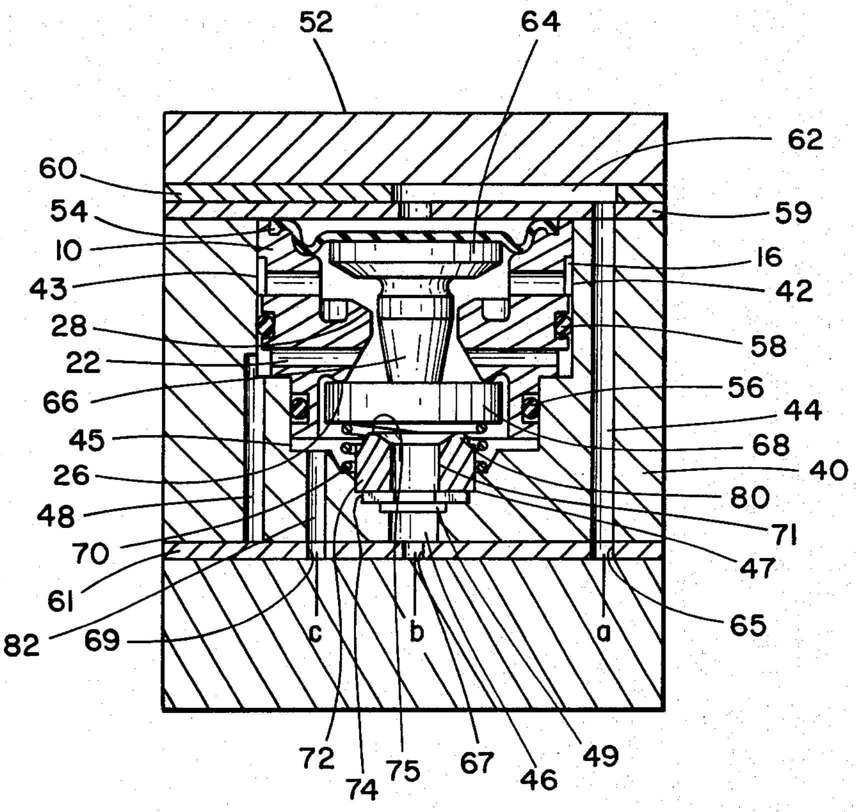
FIG. 4 is a cross-sectional view of the primary universal insert in combination with a universal insert in combination with a universal secondary seat and a universal body block to form a NOT element.
Figure 6:
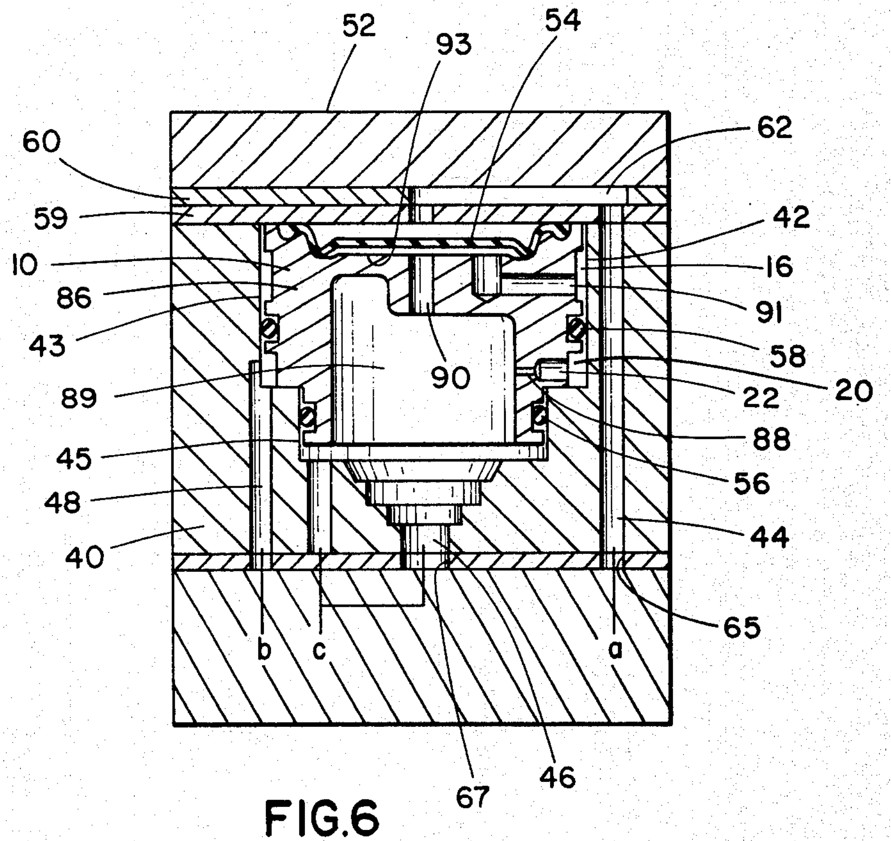
FIG. 6 is a cross-sectional view of the universal body block as utilized to make a TIMER or TIMING element.
Figure 7:
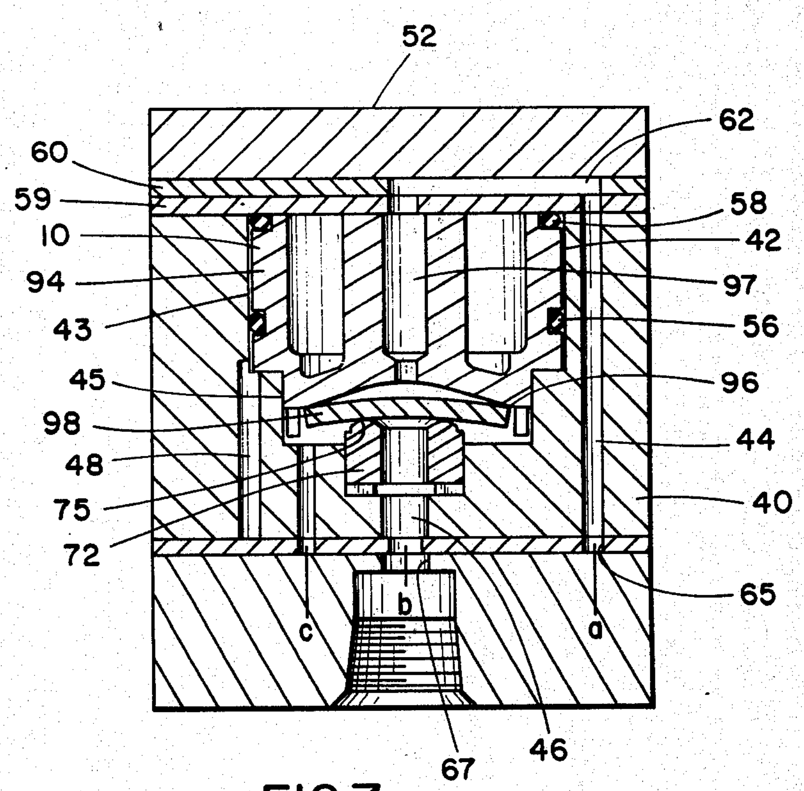
FIG. 7 is a cross-sectional view of the universal body block and the universal secondary valve insert as utilized to form an OR element.

Utilizing the insert 10 described in FIGS. 1 and 2 in combination with a universal cavity of a universal body block 40, it is possible to provide an AND and a NOT logic element as illustrated in FIGS. 3 and 4. Utilizing the universal cavity of the body block 40 shown in FIGS. 3 and 4, it is also possible in combination with other inserts to provide a TIMING (TIMER, TIM.) element as shown in FIG. 6 and an OR element as shown in FIG. 7. The following description will, therefore, be initially directed to a discussion of the AND and NOT elements. This will be followed by a discussion of the TIMING and OR elements of FIGS. 6 and 7. Finally, complex circuits comprised of a plurality of separate logic elements will be described.

AND AND NOT ELEMENTS

Referring first to FIG. 3, the insert 10 is positioned within a cavity 42 of body block 40. A body block 40 may include one or more cavities 42. The body block 40 is, therefore, generally a parallelepiped shape having one or more multi-radii cylindrical bores or cavities 42. The bore 42 forms a passage through the block 40. The bore 42 has sections of decreasing radius along the axis through the block 40 and defines an opening that is complementary with the insert 10. Thus, the bore 42 includes an upper region 43 of maximum radius, an intermediate region 45 of a first reduced radius, a lower region 47 of still further reduced radius connected with a land 49 of further reduced radius and finally an axial exit passage 46.

The block 40 also includes a first passage 44 extending completely through the block 40 parallel to the axis of cavity 42. A third passage 48 is also defined in the wall of the block 40 extending from one surface of the block to the upper region 43.

The insert 10 fits in cavity 42. A cover element 52 is attached by fastening means 50 to the top of the body block 40 and cooperates with gasket 60 and seal plate 59 to hold the diaphragm 54 against the insert 10. Seals 56 and 58 are positioned within the grooves 12 and 14 respectively of the insert 10.

The exhaust groove 16 connects through a passage 51 (in FIG. 9) in the body block 40 to the atmosphere. The passage 44 connects through an appropriate channel 62 in the gasket 60 through seal plate 59 to the top side of the diaphragm 54. A poppet 64 fits against the opposite side of the diaphragm 54 and includes a post extension 66 that engages a valve element 68.

Figure 5A:
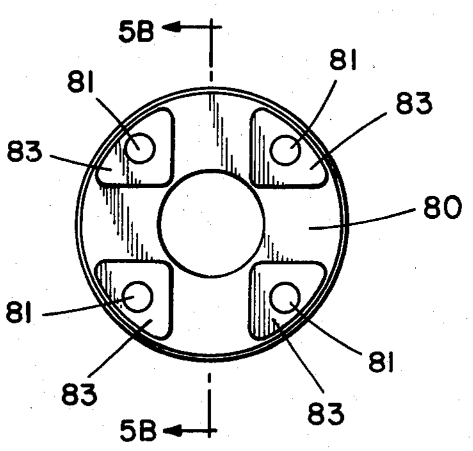
FIG. 5A is a plan view of the universal seat insert from one end.
Figure 5B:
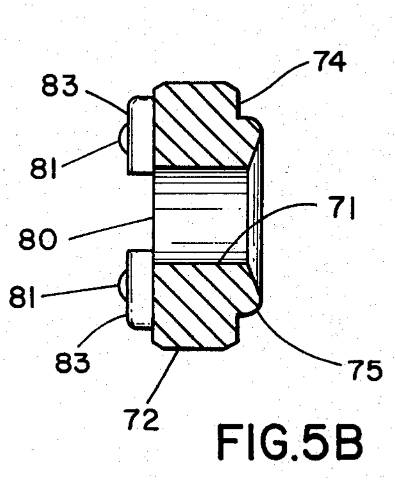
FIG. 5B is a cross-sectional view taken along the line 5B—5B in FIG. 5A.
Figure 5C:
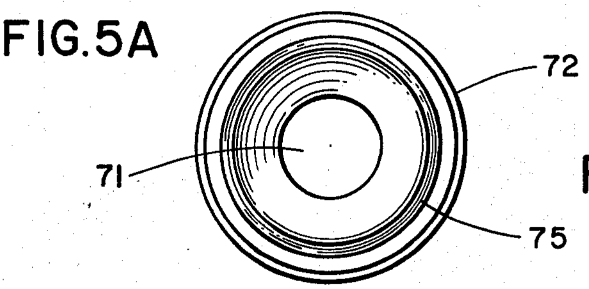
FIG. 5C is another plan view of the secondary valve seat insert from the end opposite FIG. 5A.

The valve element 68 is biased against the post extension 66 and thus the poppet 64 by a spring 70. The spring 70 is maintained in a centered position over passage 46 by means of a universal secondary insert 72. This secondary insert 72, as will be seen in regard to the discussion of FIGS. 4 and 5, is a universal type insert which may be used with the AND, NOT and OR elements. That is, referring to FIGS. 5A, 5B and 5C, the insert 72 includes an axial passage 71. An annular groove 74 and ridge or seat 75 are provided at one end. Groove 74 is for cooperation with the land 47 of the block 40. The ridge 75 is sized to fit against land 49. The center portion of insert 72 has an outer radius approximately equal to the radius of the region 47 to insure a tight fit. Radial channels or passages 80 are defined in the opposite end surface of insert 72. Raised projections 81 prevent valve 68 from sealing against radial ridges 83.

Again referring to FIG. 3, the first, second and third passages 44, 46 and 48, respectively, are also labeled *a*, *b* and *c*, respectively. In the device illustrated in FIG. 3, ports *a* and *b* serve as fluid inlets and port *c* serves as a fluid outlet. The device thus performs in substantially the same manner as the AND device disclosed in Brandenberg U.S. Pat. No. 3,385,322, the description of which is incorporated herewith by reference. That is, pressure must be provided to ports *a* and *b* in order for pressure to be sensed at outlet *c*. Providing pressure at inlets *a* and *b* will cause the poppet 64 to be depressed, thereby unseating valve 68 from valve seat 26 and simultaneously seating an O-ring 78 of poppet 64 against seat 28. Fluid pressure through port *b* flows through the axial passage 71 defined in secondary insert 72 as well as through radial channels 80 at the end of the insert 72, around valve 68, thence through the passage 22 and ultimately out port *c*. Fluid pressure is directed to passageways *a* and *b* and from passageway *c* in body block 40 through channels 65, 67 and 69 in gasket 61 maintained by a block 53 or, alternatively, from external connections (not shown).

FIG. 4 illustrates a NOT element. Like parts are identified with like numerals. The NOT of FIG. 4 includes substantially the same components as used in the AND of FIG. 3. An O-ring seal 78 has been eliminated from the neck or post 66 of the poppet 64. The connecting passage 48 is not used and in its place the port *c* is connected by means of a passage 82 to region 45. Note passage 82 may be universally provided in block 40 and sealed by gasket 61 when an AND element is fabricated as shown in FIG. 3.

Referring again to FIG. 4, the secondary insert 72 has been reversed in position relative to the position shown in FIG. 3. The secondary insert 72 thus exposes seat 75 for cooperation with the valve element 68. The valve element 68 is then intermediate opposed seats 75 and 26.

The NOT element disclosed and depicted in FIG. 4 is operable substantially in the manner disclosed by Brandenberg U.S. Pat. No. 3,389,720, which patent is incorporated herewith by reference. That is, port *a* serves as a control port, port *b* serves as a fluid inlet port and port *c* serves as a fluid outlet port. When there is no control pulse flowing in port *a*, fluid flows freely from port *b* and out port *c*. Providing a control pulse through port *a* causes the valve element 68 to be seated on the secondary insert seat 75, thereby sealing the inlet *b* from the outlet *c*. The outlet *c* is then exhausted through exhaust passage 17 and passage 51 as previously described.

As can be appreciated the AND and the NOT elements can thus be constructed from many common parts with only minor variations required in the body block component 40; namely, passage 82 is substituted for passage 48. Otherwise, the components are substantially the same, the only difference in parts being the removal of O-ring seal 78 and the reversal of the insert 72.

TIMING ELEMENT

Referring now to FIGS. 6 and 7, in both instances the body block 40 is the same as that previously described for the AND and NOT elements in FIGS. 3 and 4 respectively. FIG. 6 depicts the TIMING element and FIG. 7 depicts an OR element.

In the TIMING element of FIG. 6 a special insert 86 is utilized in combination with the diaphragm 54. The insert 86 is modified relative to the universal insert 10 inasmuch as the axial passage 24 is expanded to form a chamber 89. A restrictor 88 is also provided in passage 22 to the chamber 89. The exhaust channel 17 is replaced by a channel 91 connected with a top outside surface 93 of chamber 89. Axial passage 90 connects chamber 89 with surface 93. The insert 86 is otherwise the same as insert 10 and the passages of cavity 42 are the same as previously described.

The TIMER device operates substantially in the same manner as disclosed in Brandenberg U.S. Pat. No. 3,466,004. That is, air supply is provided through ports *a* and *b*. Air through port *b* passes through groove 20, radial passage 22 and restrictor 88 in insert 86 into chamber 89. Then air flows out of port *c* to an *a* port of a NOT or AND element. Channel 90 connects from chamber 89 to the lower side of diaphragm 54.

Air through port *a* acts on the opposite side of diaphragm 54 to pressurize the diaphragm 54 and seal it against the surface 93. When pressure at port *a* (inlet 44) is released and pressure in chamber 89 builds, the diaphragm 54 is released from surface 93. Diaphragm 54 moves away from surface 93 to allow fluid pressure in chamber 89 to exhaust or escape through channels 90 and 91 to an outlet (51 in FIG. 9) in the body block 40 to atmosphere. The description of Brandenberg U.S. Pat. No. 3,466,004 is incorporated herewith by reference.

OR ELEMENT

FIG. 7 discloses an OR element which operates substantially in the same manner as disclosed in Brandenberg U.S. Pat. No. 3,403,693, which patent is incorporated herewith by reference. The body block 40 for the OR element is the same body block utilized for the NOT element disclosed in FIG. 4. A special insert 94 is provided. Insert 94 includes a seat 96 positioned for cooperation with a flexible valve element 98 and an axial inlet passage 97. The secondary insert 72 is positioned in the same manner as described for the NOT of FIG. 4. In this manner, the valve element 98 is interposed between inserts 94 and 72 and may be seated simultaneously against both seats 75 and 96 of the inserts 72 and 94 respectively. Air flow through either inlet port *a* or *b* will cause the element 98 to flex thereby permitting flow through the outlet port *c*. Note that the radii of seats 96 and 75 are varied to permit valve 98 flexure, seat 96 having the major radius.

An alternative construction for the OR element would include a non-flexible valve element in place of the flexible element 98. In this event, the seats 96 and 75 would be separated so that the non-flexible element could float freely between the seats thereby permitting passage of the fluid about the element upon pressure at either of the inlet ports *a* or *b*. Such a structure would be fully equivalent to the structure disclosed in FIG. 7.

In summary, it can be seen that within a universal body block 40, all cavities 42 are identical and can be utilized for manufacture of the AND, NOT, TIMING and OR devices. A universal secondary insert 72 is used to make the AND, NOT and OR devices. A universal insert 10 is utilized to make the AND and NOT elements.

COMPLEX CIRCUITS

In the foregoing there has been set forth a preferred embodiment of each element of the present invention. FIGS. 8 through 13 illustrate the embodiment of a plurality of elements in a universal body block 40 to provide an entire logic circuit within a single package.

Figure 8:
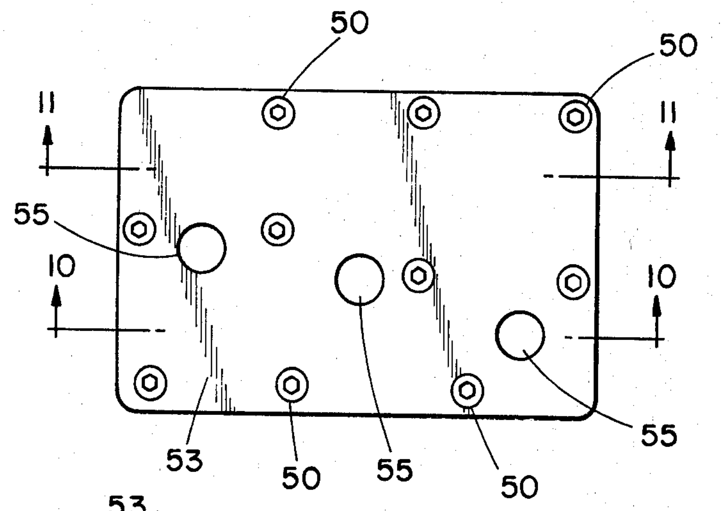
FIG. 8 is a plan view of a typical packaged logic circuit assembly incorporating a plurality of separate, connected logic elements.

FIG. 8 is the plan view of a typical fluid logic circuit package comprised of six separate, though interconnected fluid logic elements. The universal body block 40 therefore has six identical cavities 42. The number of cavities 42 is not limited. the maximum number being limited by manufacturing considerations only.

Fluid pressure inlet and outlet means 55 in cover 53 connect with fluid passage circuits (not shown) of gasket 61. The number of fluid pressure inlets and outlet means 55 are determined by the particular circuit requirement and are not limited to the number and placement shown. Fastening means 50 are used to assemble the package comprised of the cover 53, gasket 61, seal 59 attached to one side of body block 40 and additional gaskets, seals and covers as desired attached to the opposite side.

Figure 9:
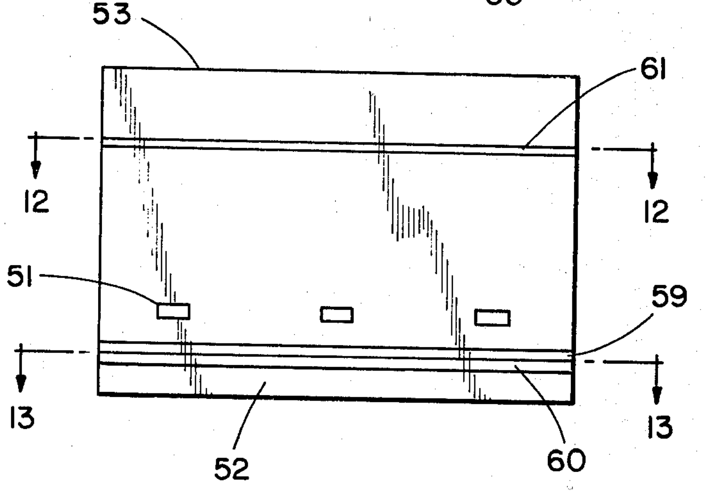
FIG. 9 is an elevation of the typical packaged logic circuit shown in FIG. 8.

FIG. 9 discloses the relative arrangement of parts of the fluid logic circuit package. The package shown includes a first cover 52, a first gasket 60, a seal plate 59, the universal body block 40, a second gasket 61, and a second cover 53. The universal body block exhaust passageways 51 are also shown in FIG. 9.

Figure 10:
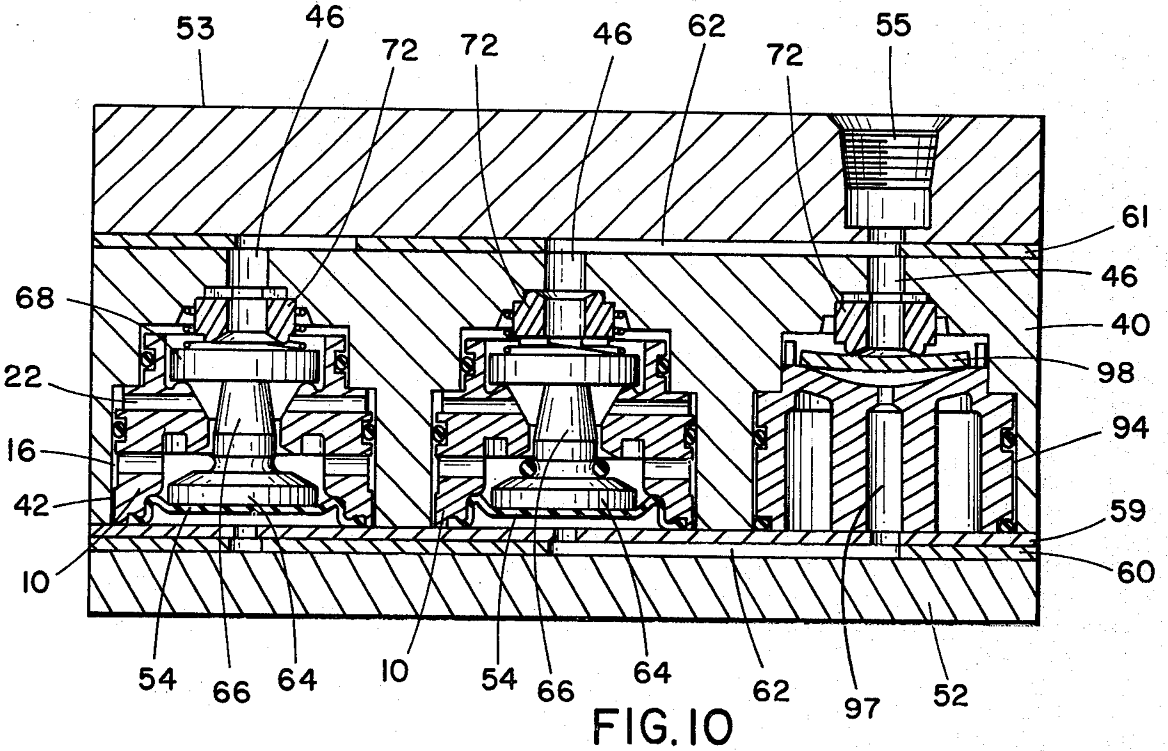
FIG. 10 is a cross-sectional view of one side of the packaged logic circuit of FIG. 8, taken along the line 10—10.

FIG. 10 is a cross-sectional view of FIG. 8 along lines 10—10 and shows the embodiment of NOT, AND, and OR elements along with all appropriate valve means described for FIGS. 3, 4, and 7. FIG. 10 also depicts fluid pressure distribution means described in more detail below.

Fluid pressure may enter through the inlet means 55. It is then directed through a circuit passageway 62 in the second gasket 61 and then to passageway 46 (nominally the *b* ports) of AND logic element centrally located and OR logic element located on the right hand side of the figure. Likewise, the lower portion of FIG. 10 shows how fluid pressure is directed from an inlet means 55 through body block 40 by means of passageway 44, thence into circuit passageway 62 of the first gasket 60, and to the nominal a ports of the same AND and OR logic elements. Seal plate 59, preferably manufactured of a semi-resilient plastic material, is used to separate the diaphragm 54 from first gasket 60 and provide support for inserts 10, 94 and 86.

Figure 11:
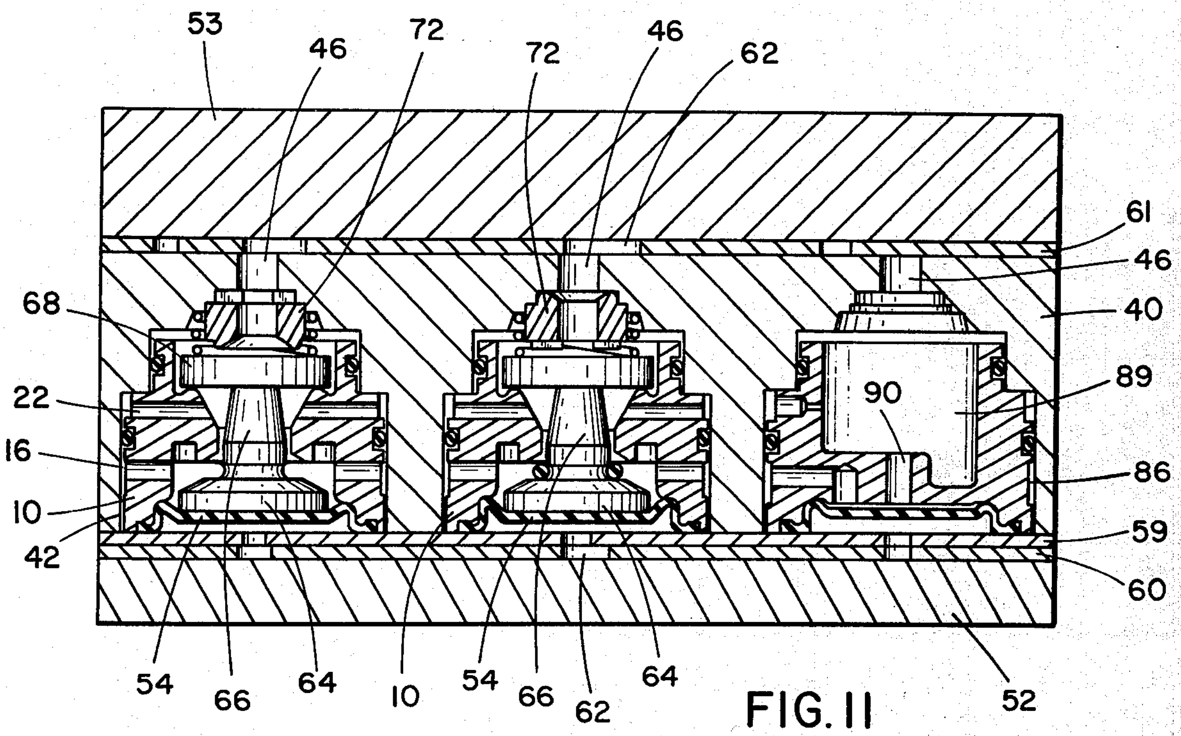
FIG. 11 is a cross-sectional view of the other side of a packaged logic circuit of FIG. 8 taken along the line 11—11.

FIG. 11 is a cross-sectional view of FIG. 8 along lines 11—11, and shows the embodiment of a NOT logic element, AND logic element, and a TIMING logic element along with appropriate valve means as described in FIGS. 3, 4 and 6.

Figure 12:
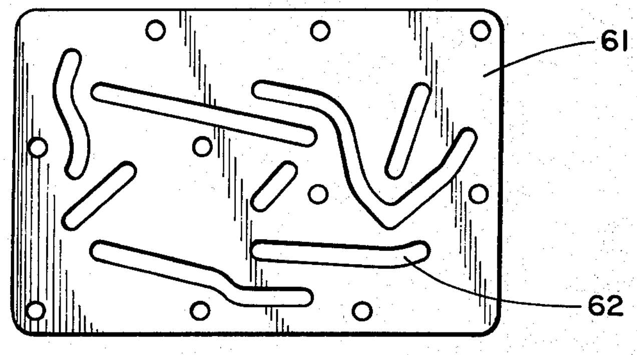
FIG. 12 is a cross-sectional view of the packaged logic circuit of FIG. 9, taken along the line 12—12.

FIG. 12 is a cross-sectional view of FIG. 9 along lines 12—12 and shows the plan view of the second gasket 61. Gasket 61 is preferably manufactured from gasket materials and includes numerous cut out portions defining fluid pressure passageways 62, direct fluid pressure to desired locations, for example from fluid pressure inlet means 55 to other prescribed passageways as determined by the logic circuit requirements. The fluid pressure passageways 62 can also direct fluid pressure between various logic element passageways, or to passageways 44 through the body block or to outlet means 55 or in any combination thereof which may be dictated by the logic circuit requirements.

Figure 13:
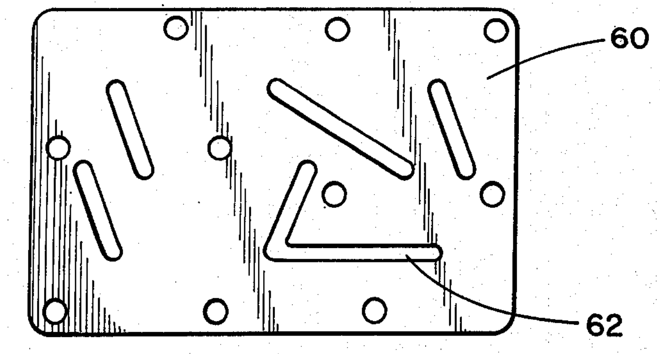
FIG. 13 is a cross-sectional view of the packaged logic circuit of FIG. 9, taken along the line 13—13.

FIG. 13 is a cross-sectional view of FIG. 9 along lines 13—13 and shows the plan view of first gasket 60. Gasket 60 functions in the same manner as gasket 61. Thus passageways 62 are included for creation of complex fluid circuits. A similar gasket and plate structure is shown in Brandenberg U.S. Pat. No. 3,408,834 which is incorporated here by reference.

In summary, it can be seen that fluid logic circuits can be manufactured simply and economically, using a minimum number of parts including a universal body block 40 in combination with a universal secondary valve seat 72, a universal logic element insert 10, a timing insert 86, an OR insert 94, and various valve means as described above. When installed in the proper combinations within the cavities 42 of the universal body block 40, the desired logic element such as AND, NOT, OR and TIMING is provided. The various ports of these logic elements can be connected to ports of other logic elements or to inlet or outlet means 55 in a predetermined manner through passageways 62 of gaskets 60, 61. The covers 52 and 53 serve as sealing members on the outside of the gaskets 60, 61. A sealing plate 59 cooperates with diaphragms 54 and the like.

The gaskets 60, 61, cavities 42 and other components used to form a multiple element package are preferably arranged in a modular manner. This arrangement is similar to that disclosed in Brandenberg U.S. Pat. No. 3,408,834 previously referenced.

While in the foregoing there has been set forth a preferred embodiment of the present invention, it is to be understood that the invention shall be limited only by the following claims and their equivalents.

What is claimed is:

1. A unitary, universal insert, for cooperation with a universal body block cavity to provide an AND or a NOT fluid logic element, comprising in combination, a member having opposite ends connected by an axial passage, a first valve seat adjacent one end of said passage for sealing said passage with a valve; a second, opposed valve seat cooperative with a poppet seal for sealing said passage intermediate the ends of said passage, a third valve seat adjacent the opposite end of said passage for sealing said passage in combination with a diaphragm element; a first channel extending radially from said axial passage between said first and second seats to the outside of said insert; and a second channel extending radially from said axial passage between the second and third seats to the outside of said insert.

2. The insert of claim 1 wherein said insert is generally cylindrical with the axis of rotation coincident with the axial passage therethrough.

3. The combination of claim 1 including circumferential means cooperative with said insert for sealing said insert with a cavity of said body block and simultaneously sealing and separating said channels from each other.

4. The insert of claim 1 including a circumferential external groove defined on the outside surface of said insert transverse to the axial passage, said groove connected with one radial passage.

5. The insert of claim 4 including a separate circumferential groove associated with each radial passage.

6. The insert of claim 1 including at least one circumferential land on the outside surface of said insert for cooperation with a complementary land in a body block cavity to align the insert axially in the body block.

7. The insert of claim 1 in combination with a universal body block and additional valve means to provide an AND or NOT logic element, said block including opposed faces and a bore therein, said bore extending between said faces through said block and including a plurality of connected sections, said bore having its opposite ends connectable to fluid sources, said bore having a first intermediate section connected to a first port in a face and a second intermediate section connected to a second port in a face, said first radial passage of said insert being connected with the first intermediate section and said second radial passage being aligned an exhaust opening from said bore.

* * * * *